United States Patent
Savage et al.

(10) Patent No.: US 9,110,983 B2
(45) Date of Patent: Aug. 18, 2015

(54) TRAVERSING DATA UTILIZING DATA RELATIONSHIPS

(75) Inventors: Norma Saiph Savage, Goleta, CA (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 13/588,828

(22) Filed: Aug. 17, 2012

(65) Prior Publication Data
US 2014/0052712 A1    Feb. 20, 2014

(51) Int. Cl.
G06F 17/30    (2006.01)
G06F 3/048    (2013.01)
G06N 5/00    (2006.01)

(52) U.S. Cl.
CPC .......... *G06F 17/30707* (2013.01); *G06N 5/003* (2013.01)

(58) Field of Classification Search
None
See application file for complete search history.

(56) References Cited

U.S. PATENT DOCUMENTS

| | | | |
|---|---|---|---|
| 6,886,010 B2* | 4/2005 | Kostoff | 1/1 |
| 2003/0004942 A1* | 1/2003 | Bird | 707/3 |
| 2006/0004711 A1 | 1/2006 | Naam | |
| 2007/0067292 A1 | 3/2007 | Trowbridge et al. | |
| 2009/0070346 A1* | 3/2009 | Savona et al. | 707/100 |
| 2009/0276377 A1* | 11/2009 | Dutta et al. | 706/12 |
| 2009/0282021 A1 | 11/2009 | Bennett | |
| 2012/0011119 A1 | 1/2012 | Baheti et al. | |

OTHER PUBLICATIONS

International Search Report and Written Opinion received for PCT Patent Application No. PCT/US2013/053170, mailed on Nov. 25, 2013, 9 pages.

* cited by examiner

*Primary Examiner* — Kakali Chaki
*Assistant Examiner* — Kevin W Figueroa
(74) *Attorney, Agent, or Firm* — Jordan IP Law, LLC (57) ABSTRACT

Systems and methods may provide traversing data using metadata. In one example, a method may include gathering a textual description of a first object, wherein the textual description includes a word, generating a vector represent the textual description, assigning a first weight value to the word, associating an object space with the word including assigning a second weight value to the word, and associating an object space with the first object.

18 Claims, 8 Drawing Sheets

TRAVERSING DATA UTILIZING DATA RELATIONSHIPS

BACKGROUND

Embodiments generally relate to traversing data relationships. More particularly, embodiments relate to utilizing data relationships to analyze contextual information about one or more objects to determine object attributes and relationships, and utilizing the attributes and relationships during data search/retrieval.

Existing search applications may typically only return a set of results based on keywords treated with equal importance, wherein the applications may fail to provide any contextual information regarding the results. As a result, searches may yield sub-optimal results from the user's perspective.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
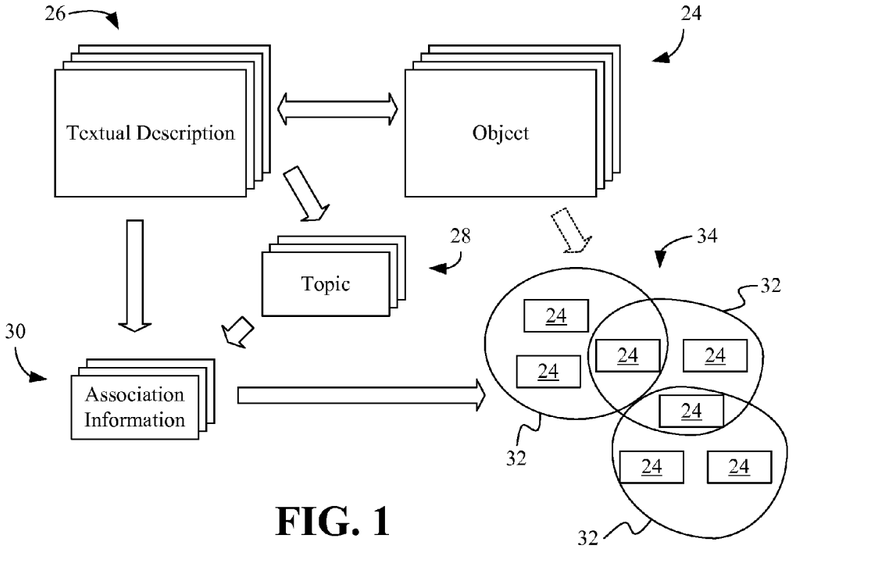
FIG. 1 is a block diagram of an example of an object space generation scheme according to an embodiment.

FIG. 1 shows a plurality of objects 24 having a corresponding plurality of textual descriptions 26 of the objects 24, wherein each illustrated textual description 26 includes words and/or phrases that depict an associated object 24. The objects 24 may be any data element that might serve as a basis of a data traversal effort. Thus, the objects 24 may represent, for example, items, locations, individuals, products and/or services that are the subject of commercial transactions, non-commercial data research efforts, social networking inquiries, and so forth. In the illustrated example, one or more topics 28 are identified based on the textual descriptions 26, wherein the textual descriptions 26 and the topics 28 may be further used to obtain association information 30.

As will be discussed in greater detail, the association information 30 may reflect degrees of association between each textual description 26 and the topics 28, degrees of association between each object 24 and the topics 28, degrees of association between each textual description 26 and the words in the textual description 26, degrees of association between words in the textual descriptions 26 and the topics 28, and so forth. The association information 30 may be used to group the objects 24 into clusters 32 of an object space 34, wherein the object space 34 may be used to respond to, and facilitate, search requests. Of particular note is that use of the association information 30 in conjunction with the textual descriptions 26 may enable searches to be formulated and/or guided by words that are not normally used to distinguish the objects 24 from one another. Accordingly, the illustrated scheme provides an unexpectedly high level of granularity and flexibility to the end user.

Figure 2:
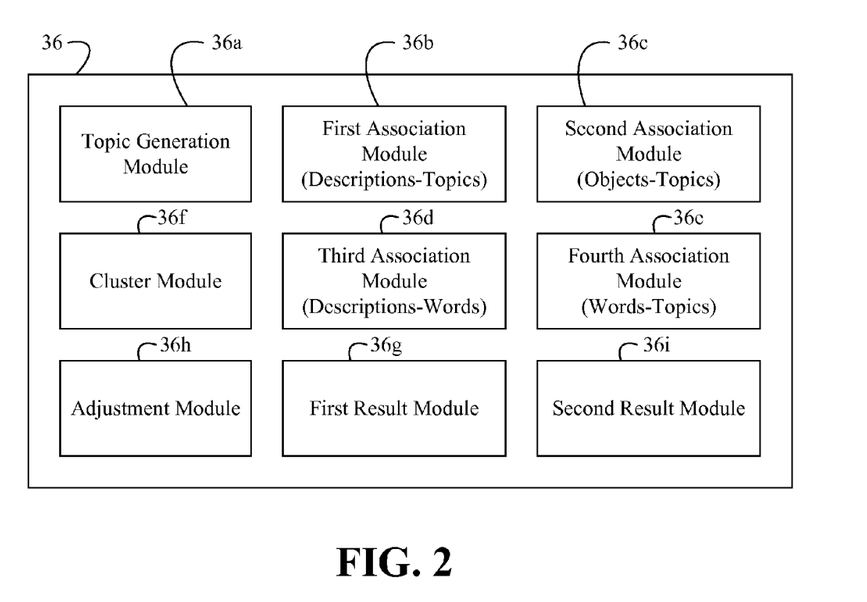
FIG. 2 is a block diagram of a logic architecture according to an embodiment.

FIG. 2 shows a logic architecture 36 (36a-36i) that may be used to both generate and traverse object spaces. In the illustrated example, a topic generation module 36a identifies one or more topics based on a plurality of textual descriptions of a corresponding plurality of objects. The topic generation module 36a may use a topic model to identify the one or more topics. Additionally, a first association module 36b may determine a first degree of association between each of the textual descriptions and the one or more topics in order to obtain first association information. As will be discussed in greater detail, the first association information may be structured as a first set of vectors corresponding to the plurality of textual descriptions. Thus, each vector in the first set of vectors may hold weight values, where each weight value indicates the degree of association between a textual description and a particular topic.

The illustrated architecture 36 also includes a second association module 36c that determines a second degree of association between each of the plurality of objects and the one or more topics in order to obtain second association information. Similarly, the second association information may be structured as a second set of vectors corresponding to the plurality of objects, where each vector in the second set of vectors may hold weight values. In this example, each weight value may indicate a degree of association between an object and a particular topic.

In one example, the architecture 36 also includes a third association module 36d that determines a third degree of association between each textual description and one or more words in the textual description in order to obtain third association information. The third association module 36d may structure the third association information as a third set of vectors corresponding to the plurality of textual descriptions, wherein each vector in the third set of vectors may have weight values that identify a frequency of occurrence of the one or more words in a respective textual description. Additionally, a fourth association module 36e may determine a fourth degree of association between each word and the one or more topics in order to obtain fourth association information. As will be discussed in greater detail, the fourth association module 36e may structure the fourth association information as a fourth set of vectors corresponding to the one or more words.

The first association module 36b may use the third and fourth association information to obtain the first association information, which reflects the degree of association between the textual descriptions and the topics. In this regard, the first association module 36b might use a probabilistic graphical model (PGM) to propagate the fourth association information (e.g., word-topic relationships) to the plurality of textual descriptions in the first association information. Additionally, the second association module 36c may use a PGM to propagate the fourth association information to the plurality of objects in the second association information. Other approaches may also be used to obtain the first and second association information. The illustrated architecture 36 also includes a cluster module 36f to group the plurality of objects into clusters based on the first association information from the first association module 36b and the second association information from the second association module 36c.

The architecture 36 may also provide for traversing the object space in accordance with search requests from end users. More particularly, the illustrated architecture 36 includes a first result module 36g that generates a first set of results based on a scope of a requested search and the object space. In one example, the object space includes a first object and a second object arranged according to a relative relationship based on an attribute. As will be discussed in greater detail, an adjustment module 36h may generate a user interface having a first adjustment mechanism configured to adjust a scope of the requested search and a second adjustment mechanism configured to adjust results of a search based on the attribute. The illustrated architecture 36 also includes a second result module 36i to generate a second set of results based on a user input received via one or more of the first adjustment mechanism and the second adjustment mechanism, wherein the second set of results includes the second object.

Figure 3:
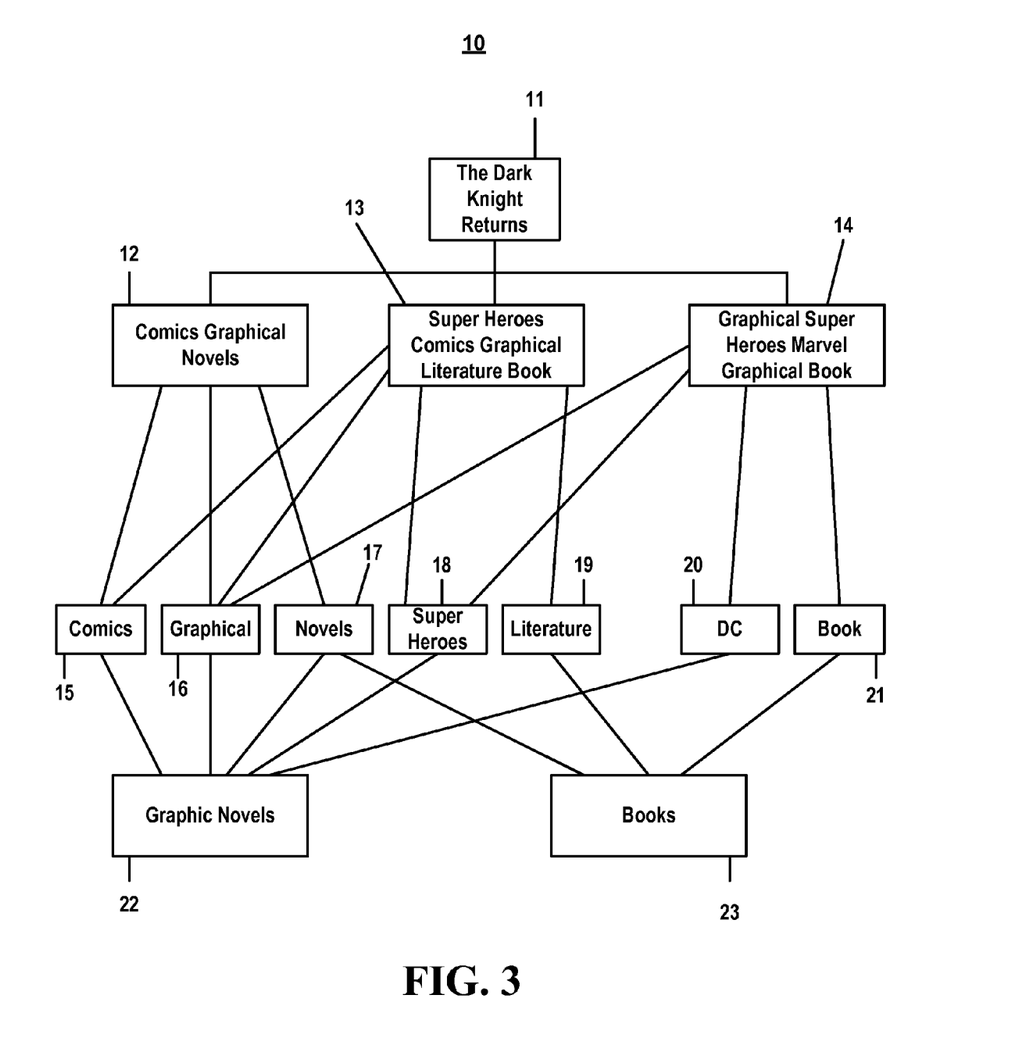
FIG. 3 is a block diagram of an example of an object data structure according to an embodiment.

Turning now to FIG. 3, an object data structure 10 is shown. The data structure 10 may include one or more elements, wherein these elements may include an object, a metadata entry, a word, and an object space. As will be discussed in greater detail, each of these elements of a data structure may represent a level (or layer) of data that may be analyzed alone or in combination with another to enhance traversing of related data (e.g., in a data search).

The illustrated data structure 10 includes an object 11. As already noted, the object 11 may be any data element that may be a basis of a data traversal effort (e.g., a data search). So, in this example, the object 11 is a graphical novel, "The Dark Knight Returns", that may be available for purchase from an online vendor. The object 11 may therefore represent a first level of data.

The object 11 may be sold in electronic commerce by more than one online vendor. Each of these online vendors may associate a textual description of the object 11 to aid in a customer's purchase of the product. Textual descriptions (or metadata) associated with the object 11 may represent a second level of data.

Moreover, the textual descriptions may include one or more words, wherein words relating to a textual description of an object may represent a third level of data. So, in this example, a first vendor (e.g., Amazon) may associate metadata 12 with the object 11. The first vendor's metadata 12 may include words 15-17 (i.e., "comics", "graphical" and "novels") to describe the object 11. Similarly, a second vendor (e.g., Ebay) may associate metadata 13 with the object 11. The second vendor's metadata 13 may include the words 15, 16, 18, 19, 21 (i.e., "superheroes", "comics", "graphical", "literature", and "book") to describe the object 11. A third vendor (e.g., Barnes & Noble) may associate metadata 14 with the object 11. The third vendor's metadata 14 may include the words 16, 18, 20, 21 (i.e., "graphical", "superheroes", "DC", "graphical", and "book") to describe the object 11. As shown in FIG. 3, vendors may uniquely use a word (e.g., "DC") to describe the object 11, may use the same words to describe the object 11 (e.g., "graphical"), or a vendor may use the same word more than once (e.g., the third vendor's use of "Graphical") when describing the object 11.

As will be discussed in greater detail, data pertaining to the object 11 (e.g., metadata 12, word 15, etc.) may be used to analyze contextual information about the object 11 to determine attributes of the object 11, wherein the attributes may then be used as parameters during a search. So, in this example, the use of the word 18 "superheroes" may be regarded as an attribute of object 11 (i.e., the object has some relation to the notion of superheroes). Another example may be the use of the word "date" in the description of a purse (as in "I took the purse with me to go on a date with my boyfriend"), or "beach" in the description of summer banana split truffles. An attribute may then be used as a parameter in a search resulting in the return of an object as a result. Of particular note is that "date" may not commonly be used by purse vendors to quantify and/or distinguish between purses. Similarly, "beach" may not typically be used to quantify truffles.

Furthermore, data pertaining to the object 11 (e.g., metadata 12, word 15, etc.) may be used to associate the object 11 with one or more clusters. Depending on the circumstance, a cluster may also viewed as a category, a topic, a group, a community, or any other grouping of objects that may be relevant to traversing data relating to the object 11. So, in this example, the object 11 may be associated with a cluster and/or topic 22, "Graphic Novels", and a second cluster and/or topic 23, "Books". A cluster may therefore represent a fourth level of data.

Figure 4:
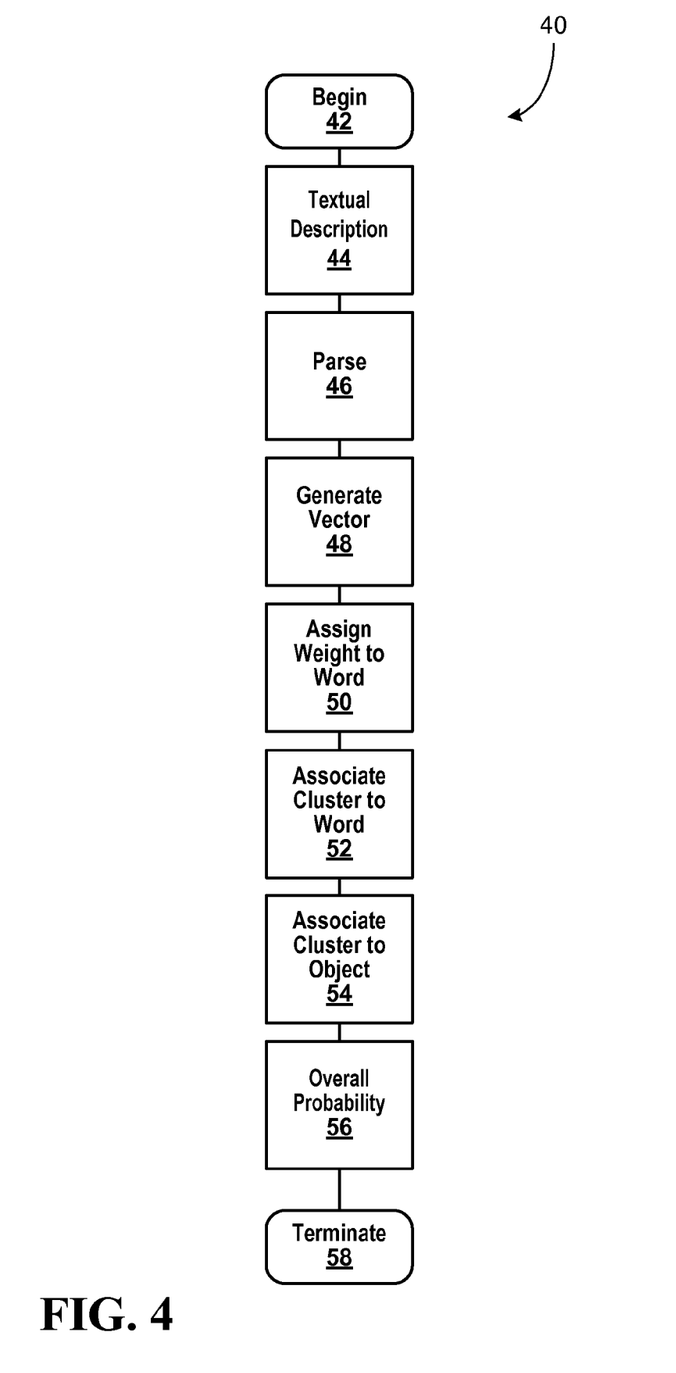
FIG. 4 is a flowchart of an example of a method of associating an object with an object space according to an embodiment.

Turning now to FIG. 4, a method 40 of associating an object with a cluster in an object space is shown. In this example, a search application may associate an object, such as the object 11 (FIG. 3), with one or more topics, such as the topics 22, 23 (FIG. 3). In this example the object may be a graphic novel, "The Dark Knight Returns."

The method 40 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 40 may be written in any combination of one or more programming languages, including an object oriented programming language such as C++ or the like and conventional procedural programming languages, such as the "C" programming language or similar programming languages. The method may begin at processing block 42.

At processing block 44, a search application may gather a textual description, such as the metadata 12 (FIG. 3), from a first source. At processing block 46, the search application may parse the textual description into one or more words. So, in the example, of metadata 12 (FIG. 3), the application parses the metadata into three words (i.e., "comics", "graphical", and "novels").

In this example, the application may be configured to parse each of the words in the textual description. However, other approaches may be used. In another example, the application may be configured to parse and utilize only particular words (e.g., unique words, nouns, adjectives, etc.) in the textual description, or even extract keywords and replace them with equivalent metadata.

At processing block 48, the application may utilize one or more words of the textual description of the first source to generate a vector representing the textual description. The vector may describe how many times a word or a concept appears in the textual description provided by the source, and may be used to describe the textual description. Thus, the vector may be part of the third association information generated by the third association module 36d (FIG. 2), already discussed. So, in the case of the metadata 12 (FIG. 3), a first vector, representing the metadata from the first vendor, may be based on the words "comics", "graphical" and "novels", each of which appears once.

In the case of multiple textual descriptions (from more than one source), the application may generate a vector for each textual description relating to the object. In such a case (i.e., multiple vectors), each vector may be weighted. In one example, each vector may be weighted equally, while in another, different weights may be assigned based on, for example, relevance to the object.

As will be discussed in greater detail, the vector may also be used to effectively determine a degree of association between a word and an object. In one example, a first word that is mentioned twice in a description pertaining to an object will have a greater degree of association with an object than a second word that is mentioned once. Moreover, by extension, if the word is regarded as an attribute of the object (as discussed above), the vector may be used to describe a degree of association between the attribute and the object.

At processing block 50, the application may assign a weight value to each word in the vector. This weight value may represent the relevance or importance of a word within its vector. In one example, words in a vector may be weighted using a probabilistic graphical model (PGM) to determine a weight of each word in the vector. So, in the case of the vector associated with the metadata 12 (FIG. 3), the first word "comics" may be assigned a first weight, the second word "graphical" a second weight, and the third word "novels" a third weight. In the case that each word in the vector is to be weighted equally, each of these words would be given a weight of one-third (⅓). In the case of multiple vectors, a word's weight in a first vector may not be the same as the same word's weight in a second vector.

As will be discussed in greater detail, the weight attributed to each word may be used to determine a degree of association between a word and its vector. As discussed above, a word may be related to an attribute of the object, and a vector may be related to a textual description of the object. So, the weight attributed to each word may also represent a degree of association between the word and its associated textual description, and a degree of association between an attribute and the word's associated textual description.

At processing block 52, the application may associate one or more clusters with each word relating to the object. In one example, the search application may utilize a topic model (e.g., Latent Dirichlet Allocation (LDA)) to analyze a word to determine a weight value. This weight value may represent a probability (ranging from zero to one hundred percent) that the word is associated with one or more clusters. So in the case of the metadata 12 (FIG. 3), utilizing the three words "comics", "graphical", and "novels", the topic model may return, for example, a probability for a first cluster in an object space, "Books", and a probability for a second cluster in the object space, "Graphic Novels". The probability that a word is associated with a cluster may be viewed as a degree of association between the word and the cluster as well.

At processing block 54, the application may associate one or more of the determined clusters with the object. In one example, the application may utilize Bayes theorem and a PGM of each object to generate a topic vector. The topic vector may represent a probability that a cluster is associated with the object. So, in the case of the metadata 12 (FIG. 3), the application may find a 98% degree of association between the category "Graphic Novels" and the object, and only a 2% degree of association between the category "Books" and the object. The probability of an object belonging to a topic may be calculated as follows:

$$P(\text{object, topic}) = \sum_{document} \sum_{word} P(\text{object, document, word, topic})$$

$$P(\text{object, document, word, topic}) =$$
$$P(\text{object})P(\text{document}|\text{object})P(\text{word}|\text{document})P(\text{topic}|\text{word})$$

At processing block 56, the application may calculate an overall probability of the object in the cluster. In one example, the overall probability of the object may be 1/n, where n represents the number of objects in the cluster. If appropriate, this weight may be modified to provide preferences to certain objects. At processing block 58, the process may terminate.

The sequence and numbering of blocks depicted in FIG. 4 is not intended to imply an order of operations to the exclusion of other possibilities. Those of skill in the art will appreciate that the foregoing systems and methods are susceptible of various modifications, variations, and alterations.

Accordingly, these various calculations may be used to represent various relationships between different layers of data pertaining to an object. As discussed above, these relationships may then be used to determine various degrees of association, including (but not limited to):

- a degree of association between a textual description and a topic (e.g., first association information);
- a degree of association between an object and a topic (e.g., second association information),
- a degree of association between a word and a topic (e.g., fourth association information);
- a degree of association between a topic and a word;
- a degree of association between a word and a textual description; and
- a degree of association between a textual description and an object.

These relationships between various data types may each be considered random variables, which may be used to traverse data (e.g., in a data search pertaining to an object). More specifically, as will be discussed in greater detail, these relationships may offer a user several options during data search, each of which may be used to focus a search to an aspect of an object in which a user may be interested.

For example, a degree of association between an object and an attribute (based on a word found in a textual description of the object) may be used to focus a search. Take, for example, the case of a consumer looking for a large backpack to carry many schoolbooks. The presence of the word "books" multiple times in a textual description of the backpack may be reflected in a vector pertaining to the object. The vector may be then used to focus a user's search based on the attribute (i.e., looking for a backpack to carry books rather than hiking). Similarly, a degree of association between an object and a textual description may be used to focus a user's search as well. In this regard, "books" may not be a word typically used to quantify and/or distinguish between backpacks.

Next, in another example, a degree of association between a first object and a second object may be used to focus a search. The degree of association between a first object and a second object may be determined by, for example, a degree of association between an attribute and the first object and the degree of association between the attribute and the second object. In one example, the degree of association between a first object and a second object may be used to generate a relative relationship (i.e., similarity, dissimilarity, etc.), wherein the relative relationship may be calculated utilizing, for example, the topic vector of each object with respect to a cluster.

So, for example, the frequent presence of the word "book" in a textual description of a first backpack and the absence of the word "book" in the description of a second backpack may generate a relative relationship between the first backpack and the second backpack around the attribute "book" (i.e., that the first backpack is better for carrying books than the second backpack). This relative relationship may be used during a "back-to-school" search for a backpack to be used by a student.

In still another example, a degree of association between an object and a cluster may allow a search application to organize and arrange the objects within the cluster. As such, a search for a particular object with respect to a particular attribute may, in some cases, begin with a search for a cluster. Once a proper cluster has been ascertained, the desired attributes may then be used to further focus the search to the desired object within the cluster. In this way, one or more objects within one or more clusters may be arranged to generate a map, or a graph of one or more dimensions or attributes.

So, for example, taking from the example described immediately above, a cluster of ten backpacks may be organized within the object space according to their various attributes using, for example, the topic vector of each object with respect to that cluster. That is, one backpack (i.e., an object) may be organized within the cluster (i.e., backpacks) utilizing its relative relationship to other objects in the space. So, in the case where the relevant attribute is books, the ten backpacks may be contextually arranged from best suitable for carrying books to least suitable for carrying books, wherein the backpack whose textual description includes heavy use of words like "books", "class" and "school" would be placed among the most suitable for carrying books. Any cluster (e.g., backpacks) affiliated with an object may be arranged and organized according to the attribute (e.g., book carrying suitability) in a similar manner.

Moreover, the degrees of association (e.g., between an object and an attribute, between an object and a cluster) and the relative relationship between objects may allow a search application to derive inferences about aspects of one or more objects (as appropriate). Take, for example, the case of a first cluster, truffles, and a second cluster, pet products. The repeated inclusion of the word "cuisine" in the textual description of objects in the first cluster, and the dearth of the word in the textual description of objects in the second cluster may allow a search application to determine that truffles are more related to gourmet cuisine than pet products. This inference may then be used to focus a search (e.g., for a gourmet cuisine) as well. Indeed, degrees of association as described herein may be used to retrieve different objects within a cluster based on non-traditional attributes. Also, if appropriate, these relative relationships may be presented to a user as knobs that he/she can manipulate, during retrieval of search results to provide context to the user regarding how the returned results may be related. Furthermore, as will be discussed in greater detail, the parameters determined as discussed above (e.g., attributes, degrees of association, and relative relationships) may be used to provide search adjustment mechanisms that may allow a user to dynamically adjust aspects of a search.

Figure 5:
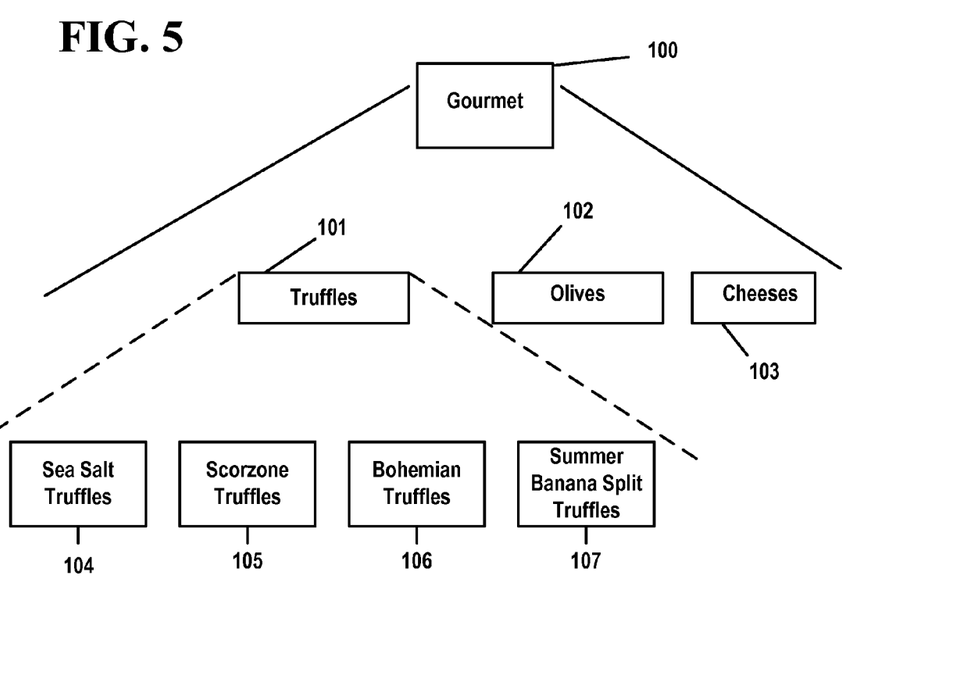
FIG. 5 is a block diagram of an example of a cluster data structure according to an embodiment.

FIG. 5 illustrates a group of objects and clusters according to one embodiment. In this example, a primary cluster 100 may pertain to "gourmet" objects that, for example, may be offered by vendors online. Also, as discussed above, data associated with an object may be analyzed to arrange the object within the primary cluster 100.

The illustrated primary cluster 100 includes three secondary clusters. The secondary cluster 101 may pertain to "truffles", the secondary cluster 102 may pertain to "olives", and the third cluster 103 may pertain to "cheeses". In this example, with regard to the attribute "gourmet", the arrangement of the secondary clusters from most gourmet to least gourmet may be illustrated by arranging them from left (i.e., most gourmet) to right (i.e., least gourmet).

The illustrated secondary cluster 101, truffles, includes four objects. The object 104 may be sea salt truffles, the object 105 may be Scorzone truffles, the object 106 may be Bohemian truffles, and the object 107 may be Summer Banana Split truffles. Again, in this example, with regard to the attribute "gourmet", the arrangement of the objects from most gourmet to least gourmet may be illustrated by arranging them from left (i.e., most gourmet) to right (i.e., least gourmet) within the secondary cluster.

Figure 6:
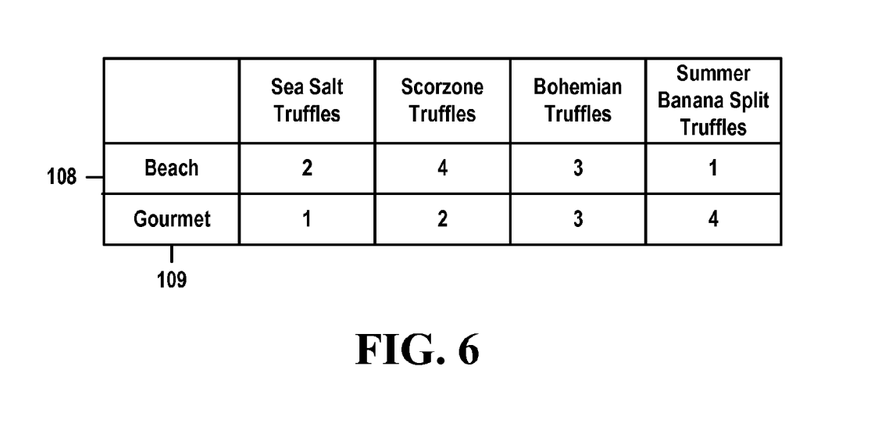
FIG. 6 is a table of an example of relative attributes according to an embodiment.

FIG. 6 illustrates degrees of association between various products according to various attributes. In the case of the objects 104-107 of FIG. 5, FIG. 6 illustrates that the objects may be arranged according to a first attribute 108 and a second attribute 109. In this example, the first attribute 108 may pertain to the "beach", while the second attribute 109 may pertain to "gourmet". As shown, when arranged according to "gourmet", the sea salt truffles may be the most gourmet, followed by the Scorzone truffles, the Bohemian truffles, and the Summer Banana Split truffles. When arranged according to the "beach", on the other hand, the summer banana split truffles may be the most suitable for a day at the beach, followed by the sea salt truffles, the Bohemian truffles, and the Scorzone truffles. As discussed above, these relationships between the objects may be derived from analysis of, for example, related textual information originating from various online vendors. Indeed, other unexpected attributes such as "breakfast" (e.g., suitability for breakfast) and "garden" (e.g., ease of growing in a home garden) may be used to characterize the relative relationships between the objects.

Figure 7A:
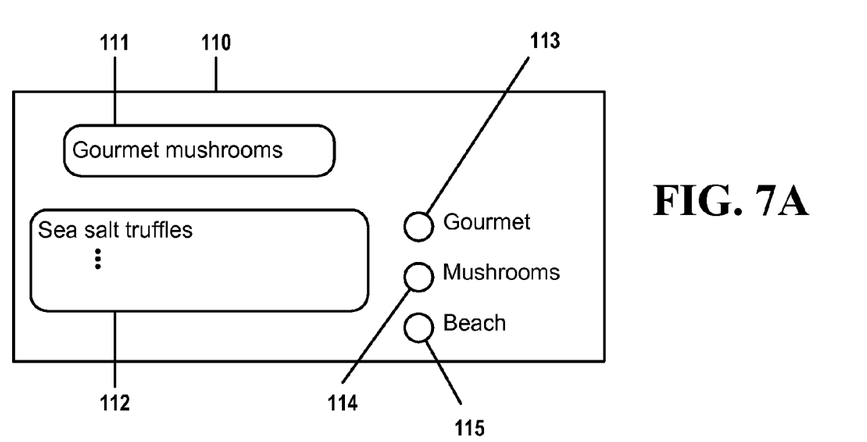
FIGS. 7A-7C are block diagrams of a graphical user interface (GUI) according to an embodiment.
Figure 7B:
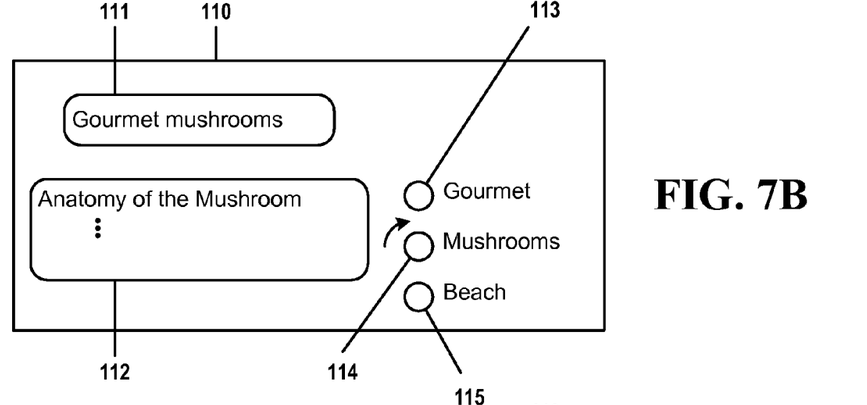
Figure 7C:
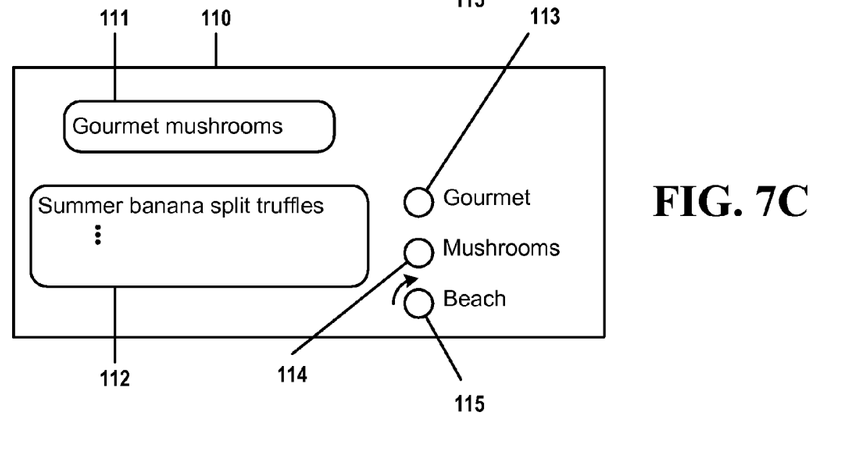

FIGS. 7A-7C illustrate a graphical user interface (GUI) 110 that may facilitate a search according to one embodiment. The GUI 110 may include a search bar 111, a results window 112, a first adjustment mechanism 113, a second adjustment mechanism 114, and a third adjustment mechanism 115.

The search bar 111 may be used to input search terms. For example, a user may enter the words "gourmet mushrooms" as a search request, wherein the results window 112 may be used to display the results of the search. In the illustrated example, the search request has returned "Sea salt truffles" as a primary result. As already noted, the user may decide that sea salt truffles are not what he or she is looking for, and therefore use the adjustment mechanisms 113-115 to dynamically adapt the search. More particularly, the first adjustment mechanism 113, the second adjustment mechanism 114, and the third adjustment mechanism 115 may be graphical widgets that may be used to adjust the search. In this example, the adjustment mechanisms 113-115 may take the form of rotatable knobs. In another embodiment, the adjustment mechanisms may 113-115 take the form of, for example, scrollable bars.

The first adjustment mechanism 113 may relate to a first aspect of the original search request, while the second adjustment mechanism 114 may relate to a second aspect of the search request. So, for example, the first adjustment mechanism 113 may be used to focus a set of retrieved results more on the attribute gourmet, while the second adjustment mechanism 114 may be used to focus the retrieved results more on the attribute mushrooms. In other words, the user might increase the second adjustment mechanism 114 and/or decrease the first adjustment mechanism 113, to retrieve results that are more closely related to mushrooms than gourmet. Doing so may cause the search application to analyze the association information related to sea salt truffles to determine whether there are any other objects that, while related to gourmet, have a stronger relationship to mushrooms. FIG. 7B demonstrates that, in one example, the adjustment process may result in a book entitled "Anatomy of a Mushroom" (e.g., wherein the book might have a chapter dealing with mushrooms as a delicacy). Similarly, the user may decrease the second adjustment mechanism 114 and/or increase the first adjustment mechanism 113, to retrieve results that are more closely related to gourmet than mushrooms. Such an action may cause the search application to analyze the association information related to sea salt truffles to determine whether there are any objects that, while related to mushrooms, have a stronger relationship to gourmet.

The third adjustment mechanism 115 may be used to adjust the search based on an attribute associated with two or more objects in the object space. In this example, the third adjustment mechanism 115 may be used to adjust a beach influence on the search results. So, for example, when a user searches for gourmet mushrooms (i.e., a primary cluster), and the retrieved search results pertain to truffles (i.e., a secondary cluster) generally, the user (if she wishes) may use the third adjustment mechanism 115 to further focus the search on truffles for a beach excursion. At this point, a search application may analyze the association information related to the sea salt truffles in order to retrieve more focused results pertaining to beach-appropriate truffles. FIG. 7C demonstrates that, in one example, the search application may return "Summer banana split truffles" as a primary result in response to such an adjustment. A user may also use the third adjustment mechanism 115 in the opposite manner (to reduce, as opposed to increase, the beach influence in the search results) as well. Of particular note is that the function of the third adjustment mechanism 115 may not include any terms of a user's original search request. Indeed, it may be determined that the "beach" is a term that is not characteristically used to quantify truffles, yet may be a useful term to end users in finding objects of interest.

Figure 8:
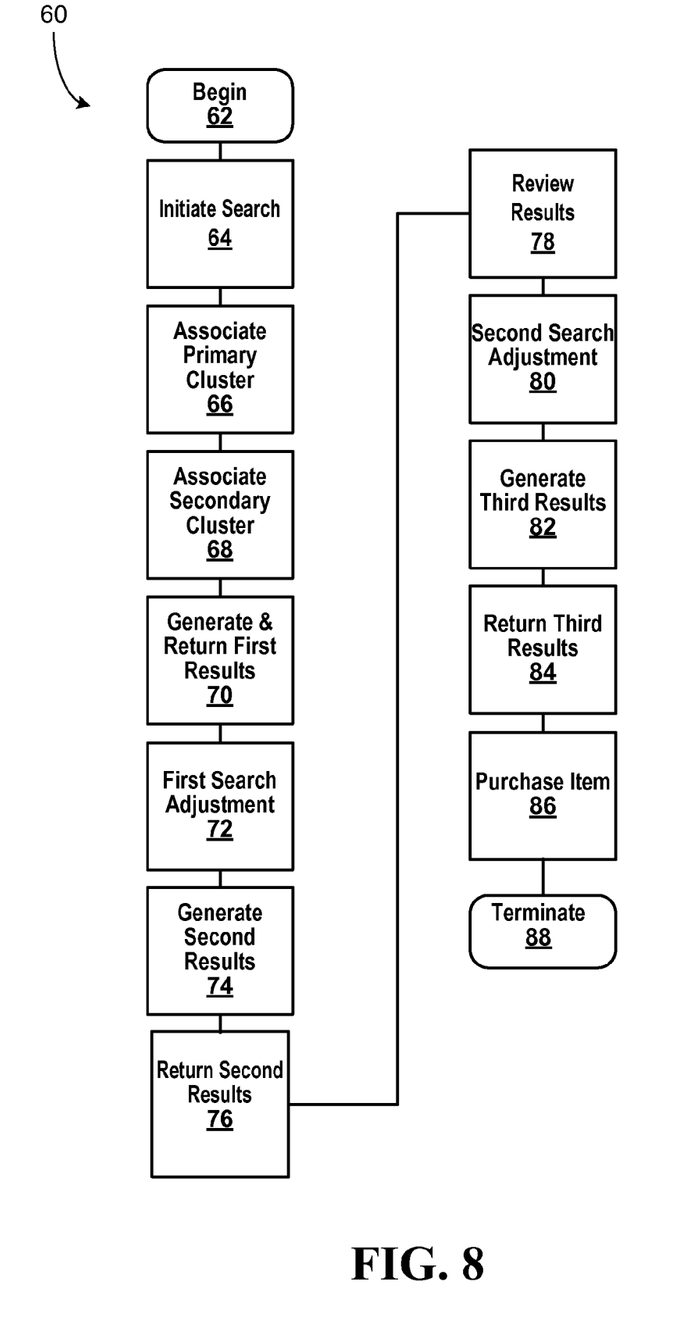
FIG. 8 is a flowchart of an example of a method of traversing data according to an embodiment.

Turning now to FIG. 8, a method 60 of traversing data is shown. In this example, a user may utilize a GUI, such as the GUI 110 (FIGS. 7A-7C) to search for gourmet truffles to purchase from products offered by online vendors.

The method 60 may be implemented as a set of logic and/or firmware instructions stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 60 may be written in any combination of one or more programming languages, including an object oriented programming language such as C++ or the like and conventional procedural programming languages, such as the "C" programming language or similar programming languages. The method may begin at processing block 62.

At processing block 64, a user may use a search bar, such as the search bar 111 (FIGS. 7A-7C) to input a term such as, for example, "gourmet mushrooms" and initiate a search. At processing block 66, a search application may associate the search terms with a primary cluster, such as the primary cluster 100 (FIG. 5) based on the attribute of "gourmet".

At processing block 68, the search application may further focus the search to one or more secondary clusters to return search results. For example, a first secondary cluster, such as the cluster 101 (FIG. 5) may pertain to truffles. A second secondary cluster, such as the secondary cluster 102 (FIG. 5), may pertain to olives. At processing block 70, the search application may return results that pertain to truffles.

Along with the returned results, the search application may provide adjustments mechanisms to navigate the search results. In particular, the search application may analyze various aspects pertaining to the cluster (e.g., attributes, degrees of association, etc.) to determine that a first aspect of the user's search may be "gourmet", and a second aspect may be "mushroom". As such, the search application may also provide a first adjustment mechanism pertaining to gourmet, such as the first adjustment mechanism 115 (FIGS. 7A-7C), and a second adjustment mechanism pertaining mushrooms, such as the second adjustment mechanism 114 (FIGS. 7A-7C). In addition, the search application may include a third search mechanism, similar to the third adjustment mechanism 115 (FIGS. 7A-7C) that may be used to adjust the results of the search based on an attribute such as the "beach". In this example, the adjustment mechanisms may take the form of a knobs.

At processing block 72, the user may review the results, and utilize the first and second adjustment mechanisms to focus the search to return results more preferred. So, in this example, the user may use the second adjustment mechanism to request that the search results focus more toward mushrooms than gourmet.

At processing block 74, the search application may utilize the user's input to recognize that the user prefers mushrooms. So, in this case, the search application may analyze objects within the object space (e.g., using degrees of association and relative relationships, as discussed above) to determine that the most appropriate result is a particular object, such as the book "Anatomy of a Mushroom". At processing block 76, the search application may return the result to the user.

At processing block 78, the user may view the result and determine that the book "Anatomy of a Mushroom" is too closely related to mushrooms and not related enough to beach-appropriate gourmet foods. At processing block 80, the user may therefore use the first adjustment mechanism (relating to gourmet) to focus the search results back towards gourmet foods and use the third adjustment mechanism to incorporate the attribute "beach" into the data traversal process.

At processing block 82, the search application may analyze objects within the object space first secondary cluster based on the user's request. That is, the search application may (e.g., using degrees of association, relative relationships, etc.) determine that Summer banana split truffles are both more related to gourmet foods and more related to a day at the beach than the other objects in the object map. At processing block 84, the search application may return the second result to the user. At processing block 86, the user may conduct a transaction to purchase the Summer banana split truffles from the online vendor offering them. At processing block 88, the process may terminate. The sequence and numbering of blocks depicted in FIG. 8 is not intended to imply an order of operations to the exclusion of other possibilities. Those of skill in the art will appreciate that the foregoing systems and methods are susceptible of various modifications, variations, and alterations.

For example, in the embodiment illustrated in FIG. 8, the objects may be analyzed according to attributes relating to objects. More specifically, the results to be returned to the user were being analyzed with respect to a beach attribute of truffle objects. An analysis of a search application need not be limited, however, to attributes pertaining to objects. In other embodiments, a search application may take into account other information as well. So, for example, a search application may analyze a user profile to determine that the user is environmentally-conscious. In this case, the search application may account for this aspect by providing an adjustment mechanism to adjust for eco-friendly products.

Figure 9:
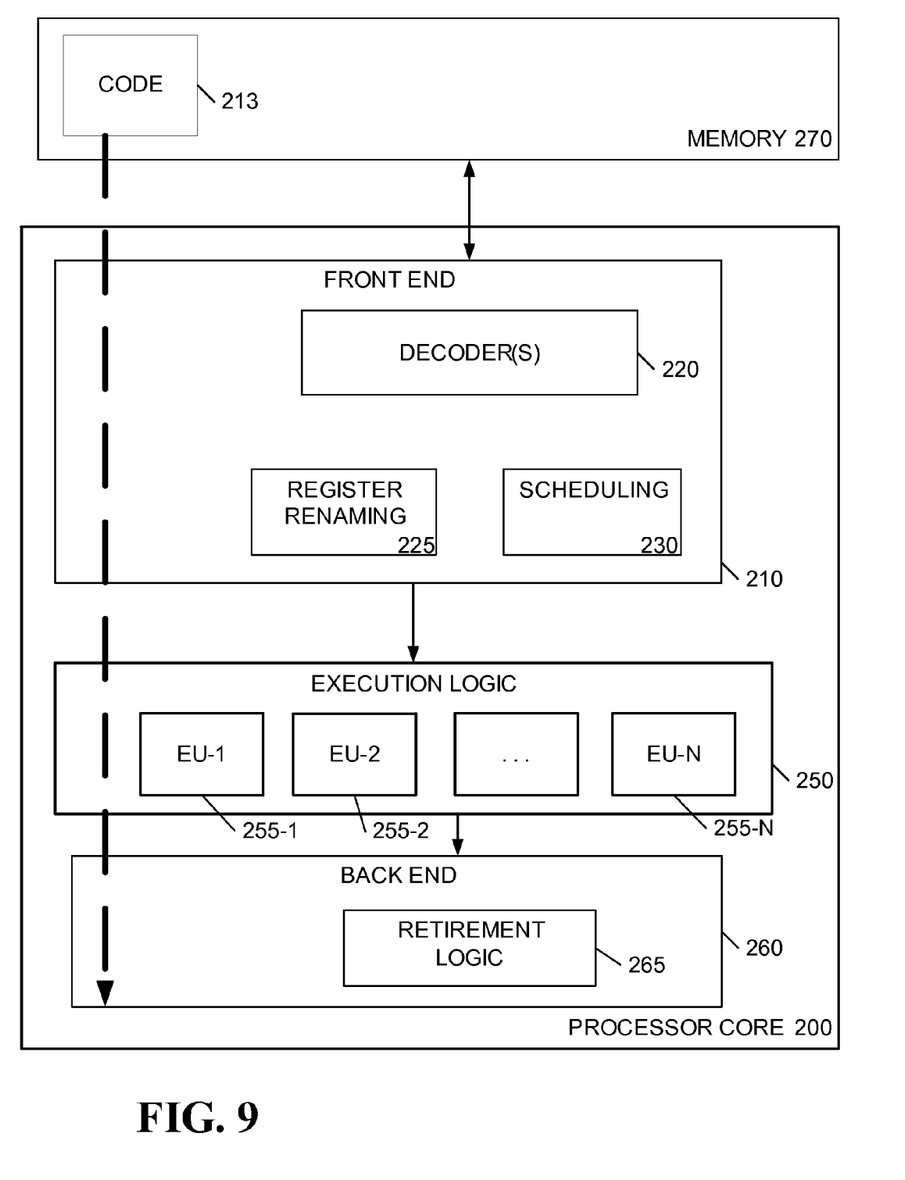
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the logic architecture 36 (FIG. 2), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
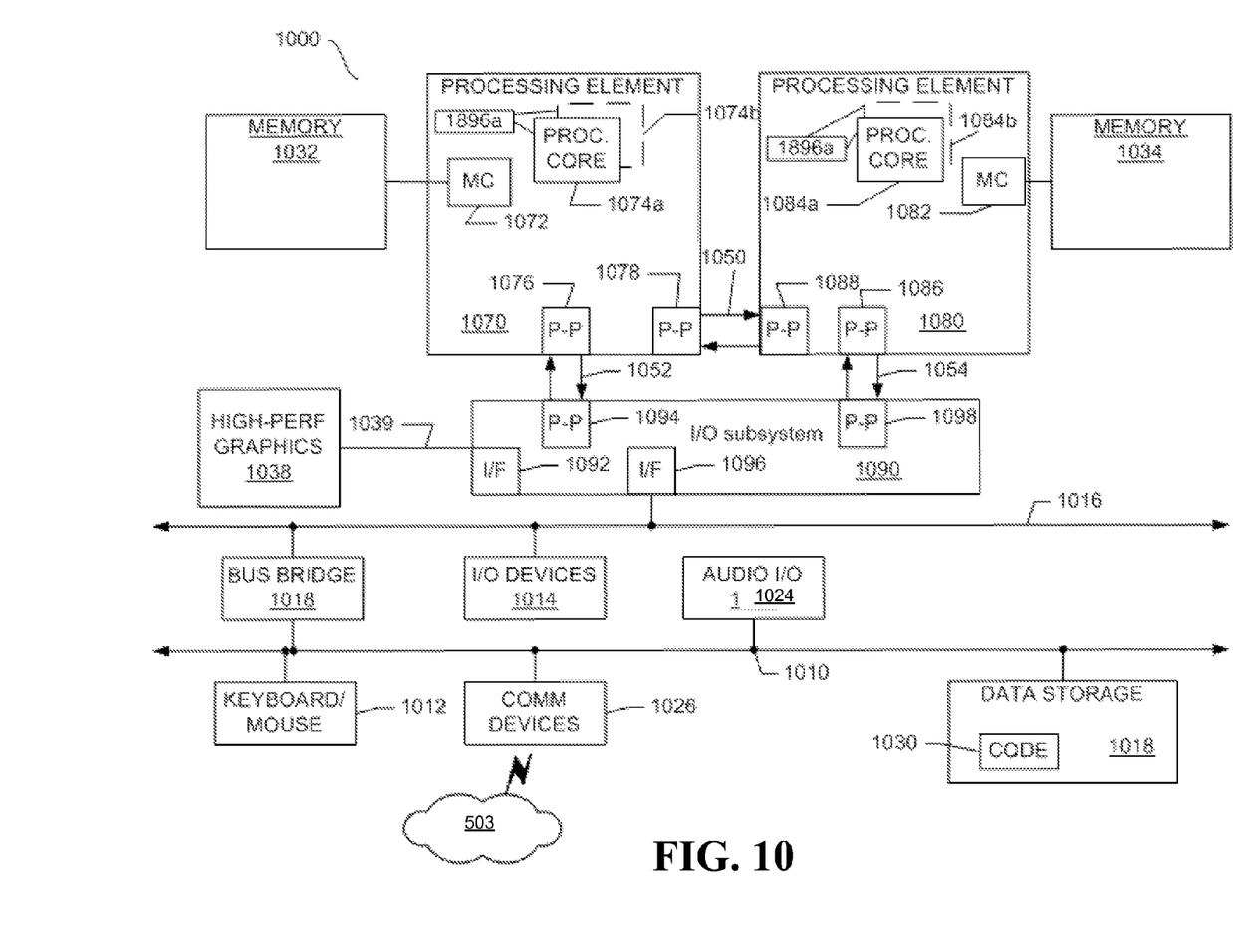
FIG. 10 is a block diagram of an example of a system according to an embodiment.

Referring now to FIG. 10, shown is a block diagram of a system embodiment 1000 in accordance with an embodiment of the present invention. Shown in FIG. 10 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 9.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to the first bus 1016, along with a bus bridge 1018 which may couple the first bus 1016 to a second bus 1010. In one embodiment, the second bus 1020 may be a low pin count (LPC) bus. Various devices may be coupled to the second bus 1020 including, for example, a keyboard/mouse 1012, network controller(s)/communication device(s) 1026 (which may in turn be in communication with a computer network, 503), and a data storage unit 1018 such as a disk drive or other mass storage device which may include code 1030, in one embodiment. The communications devices 1026 may be used to receive text descriptions of objects, as already discussed. The code 1030 may include instructions for performing embodiments of one or more of the methods described above. Thus, the illustrated code 1030 may implement the logic architecture 36 (FIG. 2) and could be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Examples may therefore include an object space generation system having a network controller to receive a plurality of textual descriptions, wherein each textual description includes one or more words and phrases that depict an object in a plurality of objects. Additionally, the system may include a first association module to determine a first degree of association between each of the plurality of textual descriptions and the one or more topics to obtain first association information, and a second association module to determine a second degree of association between each of the plurality of objects and the one or more topics to obtain second association information. In addition, the system may include a cluster module to group the plurality of objects into clusters based on the first association information and the second association information.

Moreover, the system may further include a topic generation module to identify the one or more topics based on a plurality of textual descriptions.

In addition, the topic generation module may use a topic module to identify the one or more topics.

In addition, the first association module may structure the first association information as a first set of vectors corresponding to the plurality of objects, and the second association module may structure the second association information as a set of vectors corresponding to the plurality of textual descriptions.

Additionally, the system may further include a third association module to determine a third degree of association between each textual description and one or more words in the textual description to obtain third association information, and a fourth association module to determine a fourth degree of association between each word and the one or more topics to obtain fourth association information. The first association module may use the third and fourth association information to obtain the first association information, and the second association module may use the third and fourth association information to obtain the fourth association information.

In addition, the first association module may use a probabilistic graphical model (PGM) to propagate the fourth association information to the plurality of textual descriptions.

In addition, the second association module may use a probabilistic graphical model (PGM) to propagate the fourth association information to the plurality of objects.

Moreover, the third association module may structure the third association information as a third set of vectors corresponding to the plurality of textual descriptions, and the fourth association module may structure the fourth association information as a fourth set of vectors corresponding to the one or more words.

In addition, each vector in the third set of vectors may have weight values that identify a frequency of occurrence of the one or more words in a respective textual description.

In addition, the cluster module may spatially order the clusters based on relative relationships between the objects and clusters.

In another example, a method of generating an object space includes determining a first degree of association between each of a plurality of textual descriptions and one or more topics to obtain first association information, determining a second degree of association between each of a plurality of objects and the one or more topics to obtain second association information, and grouping the plurality of objects into clusters based on the first association information and the second association information.

Moreover, each textual description may include one or more of words and phrases that depict an object in the plurality of objects, wherein the method further includes identifying the one or more topics based on the plurality of textual descriptions.

In addition, the method may further include using a topic model to identify the one or more topics.

In addition, the method may further include structuring the first association information as a first set of vectors corresponding to the plurality of objects, and structuring the second association information as a second set of vectors corresponding to the plurality of textual descriptions.

Additionally, determining the first degree of association and the second degree of association may include determining a third degree of association between each textual description and one or more words in the textual description to obtain third association information, and determining a fourth degree of association between each word and the one or more topics to obtain fourth association information.

In addition, the method may further include using a probabilistic graphical model (PGM) to propagate the fourth association information to the plurality of textual descriptions.

In addition, the method may further include using a probabilistic graphical model (PGM) to propagate the fourth association information to the plurality of objects.

Moreover, the method may further include structuring the third association information as a third set of vectors corresponding to the plurality of textual descriptions, and structuring the fourth association information as a fourth set of vectors corresponding to the one or more words.

In addition, each vector in the third set of vectors may have weight values that identify a frequency of occurrence of the one or more words in a respective textual description.

In addition, grouping the plurality of objects may include spatially ordering the dusters based on relative relationships between the objects.

Other examples may include at least one computer readable storage medium comprising a set of traversal instructions which, if executed by a processor, cause a computer to generate a first set of results based on a scope of a requested search and an object space, wherein the object space is to include a first object and a second object arranged according to a relative relationship based on an attribute. The traversal instructions, if executed, may further cause a computer to generate a user interface including a first adjustment mechanism configured to adjust a scope of the requested search and a second adjustment mechanism configured to adjust results of a search based on the attribute, and generate a second set of results based on a user input received via one or more of the first adjustment mechanism and the second adjustment mechanism, wherein the second set of results is to include the second object.

Moreover, the attribute of the medium may be based on a word included in a first textual description of the first object and a second textual description of the second object.

In addition, the user interface of the medium may be a graphical user interface (GUI) and the first adjustment mechanism may be one of a knob and a scrollable bar.

In addition, the user interface of the medium may be a graphical user interface (GUI) and the second adjustment mechanism may be one of a knob and a scrollable bar.

Examples may also include a data traversal apparatus including a first result module to generate a first set of results based on a scope of a requested search and an object space, wherein the object space is to include a first object and a second object arranged according to a relative relationship based on an attribute. The data traversal apparatus may also include an adjustment module to generate a user interface including a first adjustment mechanism configured to adjust a scope of the requested search and a second adjustment mechanism configured to adjust results of a search based on the attribute, and a second result module to generate a second set of results based on a user input received via one or more of the first adjustment mechanism and the second adjustment mechanism, wherein the second set of results is to include the second object.

Moreover, the attribute of the apparatus may be based on a word included in a first textual description of the first object and second textual description of the second Object.

In addition, the user interface of the apparatus may be a graphical user interface (GUI) and the first adjustment mechanism is to be one of a knob and a scrollable bar.

In addition, the user interface of the apparatus may be a graphical user interface (GUI) and the second adjustment mechanism is to be one of a knob and a scrollable bar.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An object space generation system comprising:
  a network controller to receive a plurality of textual descriptions, wherein each textual description includes one or more words and phrases that depict an object in a plurality of objects, wherein the plurality of textual descriptions is separate from the plurality of objects, and wherein the network controller comprises hardware;
  a first association module to determine a first degree of association between each of the plurality of textual descriptions and one or more topics to obtain first association information;
  a second association module to determine a second degree of association between each of the plurality of objects and the one or more topics to obtain second association information;
  a third association module to determine a third degree of association between each textual description and one or more words in the textual description to obtain third association information;
  a fourth association module to determine a fourth degree of association between each word and the one or more topics to obtain fourth association information, wherein the first association module further is to use the third and fourth association information to obtain the first association information, and the second association module further is to use the third and fourth association information to obtain the second association information; and
  a cluster module to group the plurality of objects into clusters based on the first association information and the second association information.

2. The system of claim 1, further including a topic generation module to identify the one or more topics based on the plurality of textual descriptions.

3. The system of claim 2, wherein the topic generation module further to use a topic model to identify the one or more topics.

4. The system of claim 1, wherein the first association module further to structure the first association information as a first set of vectors corresponding to the plurality of textual descriptions, and the second association module is to structure the second association information as a set of vectors corresponding to the plurality of objects.

5. The system of claim 1, wherein the first association module further to use a probabilistic graphical model (PGM) to propagate the fourth association information to the plurality of textual descriptions.

6. The system of claim 1, wherein the second association module further to use a probabilistic graphical model (PGM) to propagate the fourth association information to the plurality of objects.

7. The system of claim 1, wherein the third association module further to structure the third association information as a third set of vectors corresponding to the plurality of textual descriptions, and the fourth association module further to structure the fourth association information as a fourth set of vectors corresponding to the one or more words.

8. The system of claim 7, wherein each vector in the third set of vectors further to have weight values that identify a frequency of occurrence of the one or more words in a respective textual description.

9. The system of claim 1, wherein the cluster module further to spatially order the clusters based on relative relationships between the objects and clusters.

10. A method of generating an object space comprising:
  receiving a plurality of textual descriptions at a network controller to receive a plurality of textual descriptions, wherein each textual description includes one or more words and phrases that depict an object in a plurality of objects, wherein the plurality of textual descriptions is separate from the plurality of objects, and wherein the network controller comprises hardware;

determining a first degree of association between each of a plurality of textual descriptions and one or more topics to obtain first association information;

determining a second degree of association between each of a plurality of objects and the one or more topics to obtain second association information;

determining a third degree of association between each textual description and one or more words in the textual description to obtain third association information;

determining a fourth degree of association between each word and the one or more topics to obtain fourth association information, wherein determining the first degree of association uses the third association information and the fourth association information to obtain the first association information, and determining the second degree of association uses the third association information and the fourth association information to obtain the second association information; and grouping the plurality of objects into clusters based on the first association information and the second association information.

11. The method of claim 10, the method further including identifying the one or more topics based on the plurality of textual descriptions.

12. The method of claim 11, further including using a topic model to identify the one or more topics.

13. The method of claim 10, further including:
structuring the first association information as a first set of vectors corresponding to the plurality of objects; and
structuring the second association information as a second set of vectors corresponding to the plurality of textual descriptions.

14. The method of claim 10, further including using a probabilistic graphical model (PGM) to propagate the fourth association information to the plurality of textual descriptions.

15. The method of claim 10, further including using a probabilistic graphical model (PGM) to propagate the fourth association information to the plurality of objects.

16. The method of claim 10, further including:
structuring the third association information as a third set of vectors corresponding to the plurality of textual descriptions; and
structuring the fourth association information as a fourth set of vectors corresponding to the one or more words.

17. The method of claim 16, wherein each vector in the third set of vectors comprises weight values that identify a frequency of occurrence of the one or more words in a respective textual description.

18. The method of claim 10, wherein grouping the plurality of objects includes spatially ordering the clusters based on relative relationships between the objects.

* * * * *